United States Patent [19]

Lew

[11] Patent Number: 5,425,277

[45] Date of Patent: * Jun. 20, 1995

[54] INERTIA FORCE FLOWMETER WITH SYMMETRIZED LOOPED CONDUIT

[76] Inventor: Hyok S. Lew, 7890 Oak St., Arvada, Colo. 80005

[*] Notice: The portion of the term of this patent subsequent to Aug. 16, 2011 has been disclaimed.

[21] Appl. No.: 169,181

[22] Filed: Dec. 20, 1993

Related U.S. Application Data

[63] Continuation-in-part of Ser. No. 643,420, Jan. 22, 1991, Pat. No. 5,295,398, and a continuation-in-part of Ser. No. 952,325, Sep. 28, 1992, abandoned, and a continuation-in-part of Ser. No. 14,802, Feb. 8, 1993, Pat. No. 5,337,616.

[51] Int. Cl.$^6$ .............................................. G01F 1/84
[52] U.S. Cl. .................................................. 73/861.38
[58] Field of Search ..................... 73/861.37, 861.38

[56] References Cited

U.S. PATENT DOCUMENTS

| | | | |
|---|---|---|---|
| 4,747,312 | 5/1988 | Herzl | 73/861.38 |
| 4,825,705 | 5/1989 | Hohloch | 73/861.38 |
| 4,957,005 | 9/1990 | Yard et al. | 73/861.38 |
| 5,020,375 | 6/1991 | Back-Pedersen | 73/861.38 |

*Primary Examiner*—Herbert Goldstein

[57] ABSTRACT

An inertia force mass flowmeter comprises a conduit with two opposite extremities restrained from experiencing lateral movement including a first end section extending in over-hanging relationship from one of the two restrained extremities of the conduit, a second end section extending in over-hanging relationship from the other of the two restrained extremities of the conduit, and a looped midsection connecting the first and second end sections to one another, wherein a first elongated support extending from a restrained extremity thereof towards the first end section of the conduit supports the over-hanging extremity of the first end section of the conduit, and a second elongated support extending from a restrained extremity thereof towards the second end section of the conduit supports the over-hanging extremity of the second end section of the conduit; wherein an electromagnetic vibrator generates a relative flexural vibration between a combination of a first half of the conduit and the first elongated support and a combination between a second half of the conduit and the second elongated support, and two relative motion sensors detecting the relative flexural vibration respectively at two locations straddling a midsection of the conduit provides an electrical variable determining the mass flow rate of media moving through the conduit.

20 Claims, 3 Drawing Sheets

INERTIA FORCE FLOWMETER WITH SYMMETRIZED LOOPED CONDUIT

This is a Continuation-In-Part to patent applications Ser. No. 07/643,420 filed on Jan. 22, 1991, now U.S. Pat. No. 5,295,398 Ser. No. 07/952,325 filed on Sep. 28, 1992 and Ser. No. 08/014,802 filed on Feb. 8, 1993 now U.S. Pat. No. 5,337,616.

FIELD OF INVENTION

This invention relates to an inertia force flowmeter or Coriolis force flowmeter that measures mass flow rate of media moving through a flexurally vibrating conduit having a symmetrized structure with respect to the center section of the conduit as a function of the level of asymmetry in the flexural vibration of the conduit about the center section thereof.

BACKGROUND OF INVENTION

When a conduit containing moving fluid media is flexurally vibrated in a primary mode having a nonuniform amplitude by an electromagnetic vibrator or other means exerting a lateral vibratory force on the conduit, the dynamic interaction between the primary flexural vibration and the convective motion of the fluid media moving through the conduit generates a secondary flexural vibration. The type of mass flowmeter known as the inertia force flowmeter or Coriolis force flowmeter measures the normalized level of the secondary flexural vibration (ratio of the level or amplitude of the secondary flexural vibration to the level or amplitude of the primary flexural vibration), and determines the mass flow rate of the fluid media moving through the conduit as a function of the measured normalized level of the secondary flexural vibration of the conduit, which normalized level of the secondary flexural vibration is most often measured in the form of a phase angle difference between the flexural vibrations of the two opposite halves of the conduit, or in the form of an electrical variable representing or related to the phase angle difference When the primary flexural vibration of the conduit is generated in a symmetric mode about a midsection of the conduit, the secondary flexural vibration occurs in an antisymmetric mode about the midsection of the conduit. If the primary flexural vibration of the conduit is antisymmetric about the midsection of the conduit, the secondary flexural vibration of the conduit occurs in a symmetric mode about the midsection of the conduit. With an exception for the inertia force flowmeters employing a small caliber vibrating conduit, e.g., less than 0.25 inch or 1 centimeter diameter, the primary flexural vibration of the conduit must be generated by exerting a vibratory force in an action-reaction relationship between two conduits or between two opposite halves of the conduit in order to prevent the supporting structure holding the vibrating conduit or conduits from experiencing mechanical noise vibrations occurring as a reaction to the flexural vibration of the conduit or conduits, which mechanical noise vibrations are highly detrimental in measuring the normalized level of the secondary flexural vibration of the conduit or conduits as a measure of the mass flow rate of media moving through the conduit or conduits.

The two biggest short-comings of the existing versions of the inertia force or Coriolis force mass flowmeters are the extremely high cost of the flowmeters and the very high pressure loss by the fluid media moving through the mass flowmeter. The problem of excessive pressure loss has been addressed by using a pair of vibrating conduits having a straight geometry flexurally vibrated relative to one another instead of a pair of curved or looped conduits having a matched geometry. Unfortunately, the sensitivity (ability to measure low mass flow rates) of the inertia force flowmeter employing a single or a pair of straight conduits is significantly inferior to the sensitivity of the inertia force flowmeter employing a single or a pair of well designed curved or looped conduits. The unreasonably high price of the inertia force flowmeters can be reduced by at least 50 percent by using a single vibrating conduits with two opposite halves thereof flexurally vibrated relative to one another instead of a pair of matched conduit vibrated relative to one another. The problem of exorbitantly high price as well as the problem of excessively high pressure loss existing with the present state of the art in the inertia force flowmeter technology can be successfully addressed by constructing an inertia force flowmeter employing a single looped conduit with a total loop angle equal to 360 degrees, wherein the two opposite halves of the single looped conduit are flexurally vibrated relative to one another in an action-reaction relationship. Cox et al (U.S. Pat. No. 4,127,028), Dahlin et al (U.S. Pat. No. 4,660,421) and Lew (U.S. Pat. No. 4,938,075) disclose a single vibrating looped conduit having a loop angle greater than 540 degrees and less than 720 degrees, wherein the two opposite halves of the looped conduit are flexurally vibrated relative to one another. Levien (U.S. Pat. No. 4,730,501) and Lew (U.S. Pat. No. 4,829,832) disclose the inertia force flowmeters employing a 360 degree loop with two opposite halves flexbrally vibrated relative to one another. Levien's apparatus fails to take the advantage provided by a looped conduit over a straight conduit, as the single looped conduit in Levien's apparatus functions in the exactly same manner as a pair of straight conduits. With the exception of Levien's apparatus that is functionally the same as an inertia force flowmeter employing a pair of straight conduits vibrated relative to one another, all of the above-mentioned prior arts employing a single looped conduit with two opposite halves flexurally vibrated relative to one another in an action-reaction relationship generate the primary flexural vibration in an antisymmetric mode about the center section of the looped conduit and, consequently, the secondary flexural vibration occurs in a symmetric mode about the center section of the looped conduit. In general, the mechanical noise vibrations transmitted to the looped conduit from the ambient structures supporting the looped conduit produce a noise flexural vibration of the looped conduit in a symmetric mode about the center section of the conduit, which symmetric noise flexural vibration cannot be distinguished and separated from the symmetric secondary flexural vibration and, consequently, the mass flow rate of media determined from the measured normalized level of the symmetric component of the resultant flexural vibration of the conduit (sum of the antisymmetric primary flexural vibration and the symmetric secondary and noise flexural vibrations) has a large error introduced by the symmetric noise flexural vibration of the conduit. Lew (U.S. Pat. No. 5,078,014) discloses a solution addressing the problem of the symmetric noise vibration, which solution teaches restraining a midsection of the single looped conduit from experiencing lateral movements. Such a measure drastically reduces the level of the symmetric noise flexural vibration entrained in the resultant flexural vibration of the conduit and, consequently, an inertia force flowmeter employing a single looped conduit with two opposite halves flexurally vibrated relative to one another and a midsection thereof restrained from experiencing lateral movements, provides mass flow measurements with a high degree of accuracy and reliability matching the standard set by the mass flowmeters employing a pair of conduits flexurally vibrated relative to one another. Of course, the pair of conduits flexurally vibrated relative to one another by an electromagnetic vibrator disposed at the center section thereof has the symmetric primary flexural vibration and the antisymmetric secondary flexural vibration, wherein the symmetric noise flexural vibration becomes excluded from the measured normalized level of the antisymmetric component of the resultant flexural vibration of the conduit in the process of determining the mass flow rate of media from the normalized level of the measured antisymmetric component of the resultant flexural vibration of the pair of conduits.

BRIEF SUMMARY OF INVENTION

The primary object of the present invention is to provide an inertia force or Coriolis force flowmeter comprising a single looped conduit with two opposite extremities secured to a support in a relationship restraining lateral movements of the two opposite extremities of the conduit, wherein two opposite halves of the looped conduit over-lap one another over at least portions of the two opposite halves of the looped conduit and an electromagnetic vibrator flexurally vibrates the two opposite halves of the looped conduit relative to one another in an action-reaction relationship; wherein the single looped conduit is supported by a plurality of elongated supports in a structural arrangement providing an assembly of the single looped conduit and the elongated supports having a structure substantially symmetric about a center plane perpendicularly intersecting with a midsection of the single looped conduit and dividing the single looped conduit into two opposite equal halves. A pair of relative motion sensors respectively disposed on two opposite sides of the center plane detects the relative flexural vibration between two opposite halves of the structural combination of the single looped conduit and the elongated supports, and respectively generate two alternating electrical signals providing an electrical variable such as a phase angle difference therebetween as a measure of mass flow rate of media moving through the single looped conduit.

Another object is to provide the mass flowmeter described in the afore-mentioned primary object of the present invention, wherein two relative flexural vibrations respectively detected by the pair of relative motion sensors comprises a primary relative flexural vibration substantially symmetric about the center plane a secondary relative flexural vibration substantially antisymmetric about the center plane, and a noise relative flexural vibration mostly symmetric about the center plane.

A further object is to provide the mass flowmeter described in the afore-mentioned primary and another objects of the present invention, wherein the single looped conduit comprises two end sections extending in an over-hanging relationship respectively from the two secured extremities of the conduit, and a looped midsection of loop angle approximately equal to 360 degrees; and wherein the over-hanging extremity of each one of the two end sections includes a supporting member extending therefrom towards and secured to the support securing the extremity of the other of the two end sections different from said each one of the two end sections of the conduit.

Yet another object is to provide the mass flowmeter described in the afore-mentioned primary and another object of the present invention, wherein the single looped conduit comprises two end sections respectively extending in over-hanging relationship respectively from the two secured extremities of the conduit, and a looped midsection of loop angle greater than 360 degrees and less than 540 degrees; wherein each one of the two opposite halves of the looped midsection includes a supporting member extending therefrom towards and secured to the support securing the extremity of one of the two end sections connected to the other of the two opposite halves of the looped midsection different from said each one of the two opposite halves of the looped midsection of the conduit.

Yet a further object is to provide the mass flowmeter described in the afore-mentioned primary and another object of the present invention, wherein the single looped conduit comprises two end sections extending in over-hanging relationship, respectively from the two secured extremities of the conduit, and a looped midsection of loop angle approximately equal to 540 degrees; wherein a midportion of the looped midsection of the conduit includes a pair of supporting members respectively disposed adjacent and parallel to the two end sections of the conduit and extending therefrom towards and secured to the support securing the two extremities of the conduit.

Still another object is to provide the mass flowmeter defined in the afore-mentioned primary and another object of the present invention, wherein the single looped conduit comprises two end sections extending in over-hanging relationship respectively from the two secured extremities of the conduit, and a looped midsection of loop angle approximately equal to 720 degrees; wherein the over-hanging extremity of each one of the two end sections includes a supporting member extending therefrom towards and secured to the support securing the extremity of the other of the two end sections different from said each one of the two end sections of the conduit.

Still another object is to provide a inertia force or Coriolis force flowmeter comprising a pair of conduits, each of which pair of conduits including two end sections and a looped midsection connecting the two end sections to one another, wherein the combination of a first end section of the first of the pair of conduits and a second end section of the second of the pair of conduits and the combination of a second end section of the first conduit and a first end section of the second conduit receive a vibratory force from an electromagnetic vibrator in an action-reaction relationship in such a way that the two opposite equal halves of each of the pair of conduits are flexurally vibrated relative to one another; wherein a pair of motion sensors respectively measuring the flexural vibration of the two opposite equal halves of one of the pair of conduits, or a pair of relative motion sensors respectively measuring the relative flexural vibration between the first end section of the first conduit and first end section of the second conduit and between the second end section of the first conduit and the second end section of the second conduit provides information such as a phase angle difference between two alternating electrical signals respectively generated by the pair of motion sensors, wherein at least one of the first and second conduits carries fluid media, of which flow rate is being measured.

Still a further object is to provide the inertia force or Coriolis force flowmeter described in the afore-mentioned still another object of the present invention wherein only one of the first and second conduits carries the fluid media, and the other of the first and second conduits has a blockage preventing any flow of the fluid media therethrough.

These and other objects of the present invention will become clear as the description of the invention progresses.

BRIEF DESCRIPTION OF FIGURES

The present invention may be described with a greater clarity and specificity by referring to the following figures.

OPERATING PRINCIPLES

Figure 1:
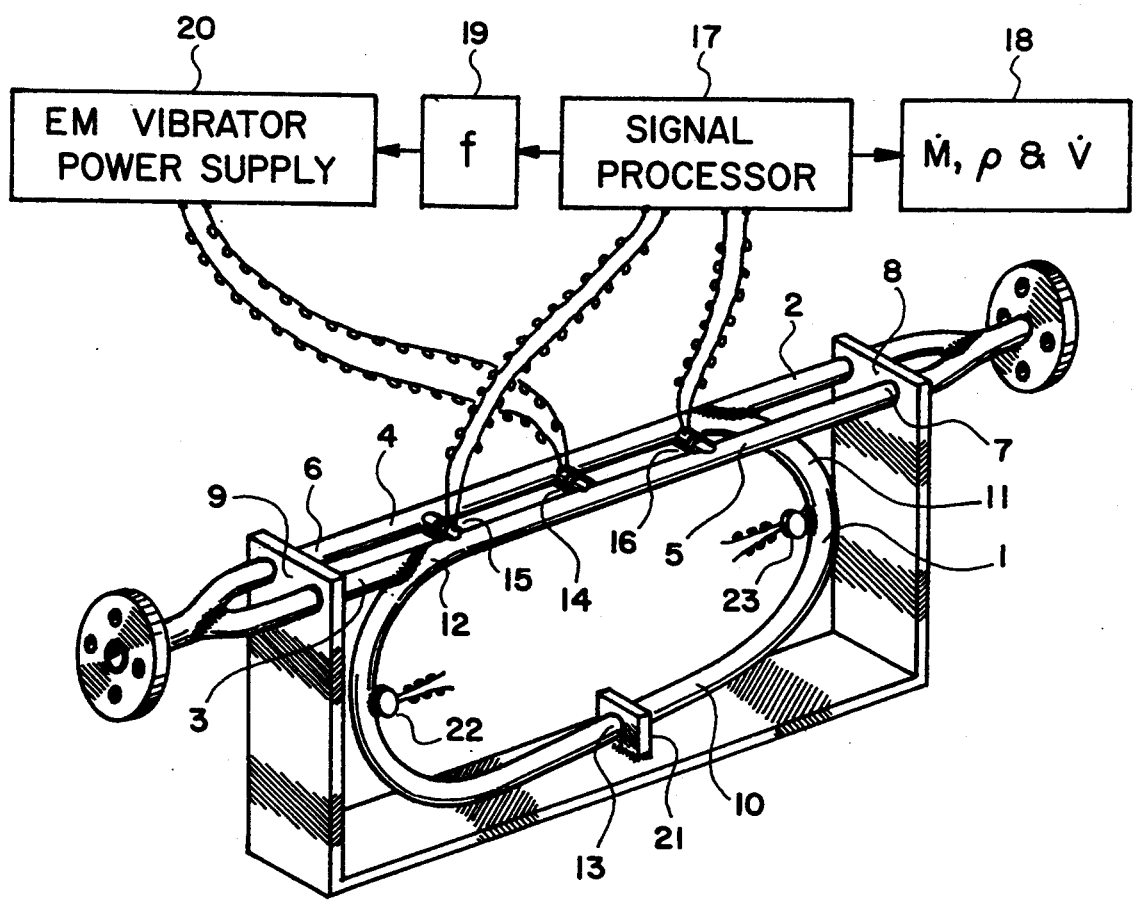
FIG. 1 illustrates an embodiment of the inertia force flowmeter comprising a single conduit including a plurality of supporting members disposed in a relationship providing a structure of the combination of the single conduit and the plurality of supporting members substantially symmetric about a center plane perpendicularly intersecting with a center section of the single conduit and dividing the single conduit into two opposite equal halves.

When a pair of conduits disposed in a superimposing structural arrangement symmetric about a center plane perpendicularly intersecting with a center portion of the combination of the pair of conduits and dividing the combination of the pair of conduits into two opposite equal halves, or two opposite equal halves of a single looped conduit supported in such a way that the relative flexural vibration between the two opposite equal halves of the single conduit occurs in a mode symmetric about a center plane perpendicularly intersecting with a center section of the single conduit and dividing the single conduit into the two opposite equal halves, are flexurally vibrated by an electromagnetic vibrator exerting a vibratory force thereon in an action-reaction relationship, the vibratory force generates a primary relative flexural vibration between the pair of conduits or between the two opposite halves of the single conduit in a mode symmetric about the center plane. The dynamic interaction between the symmetric primary relative flexural vibration and the convective motion of fluid media moving through at least one of the pair of conduits or through the single conduit generates a secondary relative flexural vibration between the pair of conduits or between the two opposite halves of the single conduit in a mode antisymmetric about the center plane. The normalized amplitude or level of the antisymmetric secondary relative flexural vibration, that is defined as the ratio of the amplitude or level of the antisymmetric secondary relative flexural vibration to the amplitude or level of the symmetric primary relative flexural vibration, is directly proportional to the mass flow rate of fluid media moving through one or both of the pair of conduits or through the single conduit. An extensive mathematical analysis on the operating principles of the inertia force flowmeter has been presented in U.S. Pat. No. 5,184,518 and U.S. patent application Ser. No. 152,370 filed on Nov. 16, 1993, wherein it has been shown that the mass flow rate of flow media is directly proportional to the normalized level or amplitude of the antisymmetric secondary relative flexural vibration is a function of a phase angle difference between two alternating electrical signals respectively generated by two motion or vibration sensors measuring the resultant relative flexural vibration between the pair of conduits or between the two opposite equal halves of the single conduit respectively at two locations located on two opposite sides of the center plane respectively, or respectively located on the center plane and on an off center plane, or as a function of a ratio of a first value of the first of two alternating electrical signals taken at a first instant when the second of the two alternating electrical signals reaches a zero value to a second value of the first alternating electrical signal taken at a second instant when the second alternating electrical signal reaches a peak value, or as a function of a ratio of a differential combination of the two alternating electrical signals to an additive combination of the two alternating electrical signals, or as a function of an electrical variable mathematically related to the phase angle difference between the two alternating electrical signals. The inertia force flowmeter of the present invention determines the mass flow rate of fluid media as a function of any one of the afore-mentioned electrical variables.

DESCRIPTION OF ILLUSTRATED EMBODIMENTS

In FIG. 1 there is illustrated an embodiment of the inertia force flowmeter comprising a combination of a single conduit 1 and a supporting structure including a first elongated support 2 and a second elongated support 3, which combination is assembled into a structure substantially symmetric about a center plane perpendicularly intersecting with a center section of the conduit and dividing the conduit into two opposite equal halves. The conduit 1 includes two end sections 4 and 5 respectively extending from two opposite extremities 6 and 7 restrained from experiencing lateral movements by the supporting brackets 8 and 9, and a looped midsection 10 of a loop angle approximately equal to 360 degrees, which looped midsection 10 of the conduit connects the over-hanging extremities 11 and 12 of the two end sections 4 and 5 of the conduit to one another. The first elongated support 2 secured to and extending from the supporting bracket 8 supports the first half 11 of the looped midsection 10 of the conduit in a relationship that produces a lateral deflection of the recti-linear combination of the first end section 4 of the conduit and the elongated support 2 spanning the space between the two supporting brackets 8 and 9 in directions, perpendicular to a plane approximately parallel to the looped midsection 10 of the conduit in a substantially symmetric mode about a center plane perpendicularly intersecting with a center section 13 of the conduit and dividing the conduit into two opposite equal halves, which lateral deflection results under mechanical vibrations of the mass flowmeter assembly in directions perpendicular to the plane parallel to the looped midsection 10 of the conduit, while the second elongated support 3 secured to and extending from the supporting bracket 9 supports the second half 12 of the looped mid section 10 of the conduit in a relationship producing a lateral deflection of the recti-linear combination of the second end section 5 of the conduit and the elongated support 3 spanning the space between the two supporting brackets 8 and 9 in substantially symmetric mode about the center plane. It should be noticed that the two elongated supports 2 and 3 respectively disposed adjacent and parallel to the two end sections 5 and 4 provide structural equivalents of two parallel beams respectively made of the first end section 4 of the conduit and the elongated support 2, and the second end section 5 and the elongated support 3, which two parallel beams spanning the space between the two supporting brackets 8 and 9 are mechanically tied to one another at the two opposite ends thereof respectively by the two supporting brackets 8 and 9, which two supporting brackets 8 and 9 prevent the two tied-together extremities of the two parallel beams from experiencing lateral movements thereat. The best result is obtained when the elongated supports 2 and 3 have a geometry respectively simulating portions of the end sections 5 and 4 respectively adjacent to the two supporting brackets 8 and 9, whereby the structural assembly of the conduit 1 and the pair of elongated supports 2 and 3 is also substantially symmetric about a plane disposed intermediate the two end sections 4 and 5 of the conduit and perpendicular to the center plane. As a matter of fact, the elongated supports 2 and 3 can be conduits carrying the fluid media wherein the elongated support 2 provides a first auxiliary flow passage branching from one extremity of the looped midsection 10 of the conduit and merging with the second end section 5 of the conduit, while the elongated support 3 provides a second auxiliary flow passage branching from the first end section 4 of the conduit and merging with the other extremity of the looped midsection 10 of the conduit. An electromagnetic vibrator 14 with action and reaction halves respectively affixed to the two opposite halves of the conduit exerts a vibratory force on a line lying on the center plane and approximately perpendicular to the looped midsection 10 of the conduit on the two opposite halves of the conduit in an action-reaction relationship, which vibratory force generates a relative flexural vibration between two opposite halves of the conduit 1. Two relative motion or vibration sensors 15 and 16 measure the relative flexural vibration between two parallel beams respectively comprising the linear combination of the first end section 4 of the conduit and the first elongated support 2 and the linear combination of the second end section 5 of the conduit and the second elongated support 3 respectively at two locations located on two opposite sides of the center plane. The best result is obtained when the two relative motion or vibration sensors are disposed symmetrically about the center plane. The signal processor 17 obtains an electrical parameter representing or varying as a function of a phase angle difference between two alternating electrical signals respectively generated by the two relative motion or vibration sensors 15 and 16, which electrical variable provides a measure of difference between the two alternating electrical signals, and a data processor 18 determines the mass flow rate $\dot{M}$ of media moving through the mass flowmeter as a function of the aforementioned electrical variable, which data processor 18 may also determine the density $\rho$ of the media as a function of a natural frequency of the conduit 1 and the volume flow rate $\dot{V}$ of the media as the ratio of the mass flow rate $\dot{M}$ of media to the density $\rho$ of the media. The frequency detector 19 determines the natural frequency f of the conduit 1 and feeds the information on the natural frequency f to the electromagnetic vibrator power supply 20 so that the electromagnetic vibrator 14 generates the relative flexural vibration at the natural frequency thereof. A center section 13 or a middle portion of the looped midsection 10 of the conduit may be restrained from experiencing a lateral movements by a supporting bracket 21 secured to a supporting structure as shown in the particular illustrated embodiments, or left unrestrained in an alternative embodiment. In an alternative design, the two relative motion or vibration sensors 15 and 16 may be replaced respectively by two accelerometer type motion or vibration sensors 22 and 23 respectively measuring the absolute flexural vibrations of the two opposite halves of the looped midsection 10 of the conduit. In another alternative design, wherein the center section 13 of the looped midsection 10 of the conduit is left unrestrained, an accelerometer type motion or vibration sensor disposed at the center section as exemplified in the embodiment shown in FIG. 2, may be employed in combination with one of the two accelerometer type motion or vibration sensors 22 and 23, or in combination with one of the two relative motion or vibration sensors 15 and 16 in generating two alternating electrical signals and determining the mass flow rate of media as a function of a difference between the two alternating electrical signals. It should be understood that the modifications and design alternatives mentioned in conjunction with the particular illustrative embodiment shown in FIG. 1 are also applicable to the other illustrative embodiments shown in FIGS. 2–6. It must be mentioned that the primary flexural vibration generated by the electromagnetic vibrator as well as the noise flexural vibration generated by mechanical vibrations of the ambient structures such as the pipes or conduits, on which the mass flowmeter is mounted, occurs in a symmetric mode about the center plane and, consequently, only the secondary flexural vibration with intensity proportional to the mass flow rate of media occurs in an antisymmetric mode about the center plane. Therefore, the inertia force flowmeter shown in FIG. 1 measures the mass flow rate of media accurately and reliably with a minimum level of the error introduced by ambient noise mechanical vibrations. It must be also mentioned that the two halves of the combination of the conduit 1 and the supporting structure comprising the first and second elongate supports 2 and 3 flexurally vibrated relative to one another by the electromagnetic vibrator 14 are perfectly balanced in the masses thereof and consequently, the relative flexural vibration therebetween occurs in a perfectly balanced action-reaction relationship and only a negligibly small portion of the relative flexural vibration becomes transmitted to the supporting structure 8, 9 and 21, which condition minimizes the noise vibration of the mass flowmeter induced by the electromagnetic vibrator 14 and maximizes the utilization of energy supplied by the electromagnetic power supply 20. It should be further mentioned that the embodiment shown in FIG. 1 teaches how to construct an inertia force flowmeter with a maximum sensitivity and minimum pressure drop, as the embodiment exemplifies a conduit configuration with a minimum loop angle that is 360 degrees.

Figure 2:
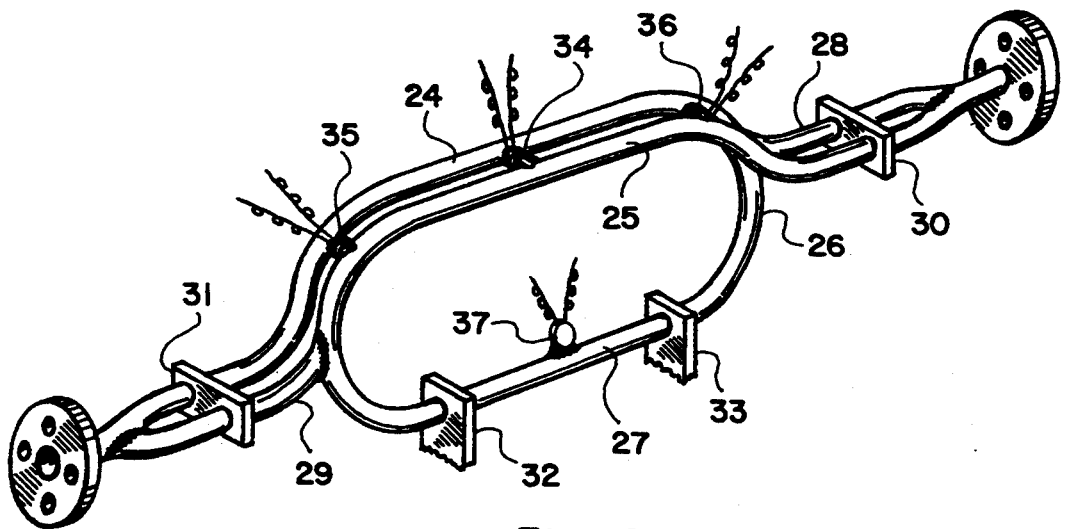
FIG. 2 illustrates another embodiment of the inertia force flowmeter comprising a single conduit and a plurality of supporting members assembled into a substantially symmetric structure about the center plane.

In FIG. 2 there is illustrated a modified version of the embodiment shown in FIG. 1. In this particular illustrative embodiment, the two end sections 24 and 25 of the conduit 26 have a curved geometry conforming with the looped midsection 27 having a loop angle greater than 360 degrees and less than 540 degrees. The two elongated supports 28 and 29 respectively secured to and extending from two supporting brackets 30 and 31 support two opposite halves of the looped midsection 27 of the conduit, respectively. A center portion of the looped midsection 27 of the conduit may be restrained from experiencing lateral movements by one or pair of brackets 32 and 33, or may be left unsecured. The electromagnetic vibrator 34 generates the relative flexural vibration, and a pair of relative motion or vibration sensors 35 and 36 generates the two alternating electrical signals. In an alternative design, the brackets 32 and 33 are omitted and an accelerometer type motion or vibration sensor 37 is included at the center section of the looped midsection 27 of the conduit, wherein the accelerometer type motion or vibration sensor 37 and one of the two relative motion or vibration sensors 35 and 36 respectively generate the two alternating electrical signals providing the electrical variable determining the mass flow rate of media.

Figure 3:
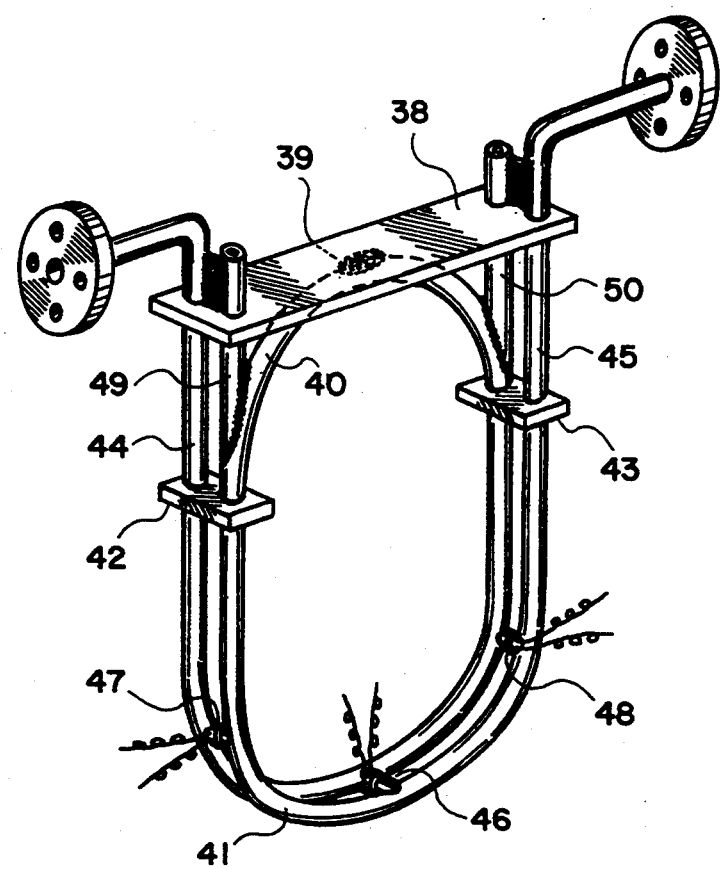
FIG. 3 illustrates a further embodiment of the inertia force flowmeter comprising a single conduit and a plurality of supporting members assembled into a substantially symmetric structure about the center plane.

In FIG. 3 there is illustrated another modified version of the embodiment shown in FIG. 1, which modified version results when the combination of the first end section 24 of the conduit and the elongated support 29 and the combination of the second end section 25 of the conduit and the elongated support 28 included in the embodiment shown in FIG. 2 are bent to parallel positions respectively tangential to the two opposite halves of the looped midsection 21 of the conduit, and two supporting brackets 30 and 31 are integrated into a single supporting structure 38 shown in FIG. 3. The center section 39 of the looped midsection 40 of a loop angle approximately equal to 540 degrees of the conduit 41 may be restrained from experiencing lateral movements by securing the center section 40 or a middle portion of the looped midsection 40 of the conduit to the supporting structure 38. An additional supporting bracket 42 mechanically tying the first end section 44 of the conduit to one half of the looped midsection 40 adjacent to the second end section 45, and supporting bracket 43 mechanically tying the second end section 45 of the conduit to the other half of the looped midsection 40 of the conduit adjacent to the first end section 44 may be included which two supporting brackets 42 and 43 are disposed in a relationship diametrically opposite to the over-hanging extremities of the conduit 41 including the electromagnetic vibrator 46 and the pair of relative motion or vibration sensors 47 and 48. The two elongated supports 49 and 50 may be converted to the two auxiliary flow passages respectively merging with the two end sections 44 and 45 of the conduit as described in conjunction with FIG. 1.

Figure 4:
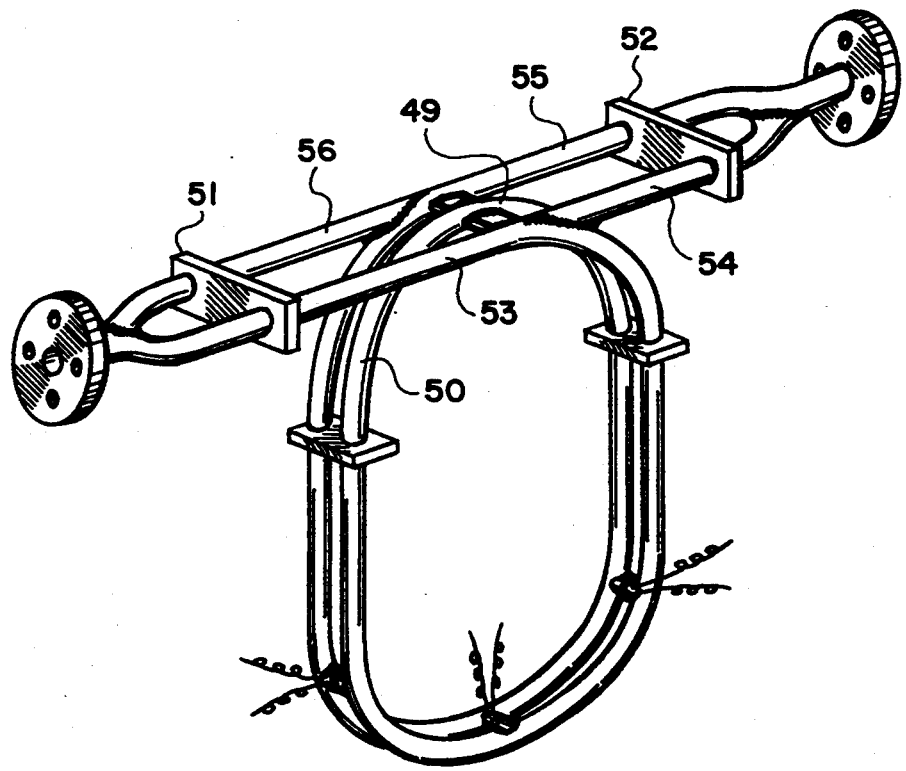
FIG. 4 illustrates yet another embodiment of the inertia force flowmeter comprising a single conduit and a plurality of supporting members assembled into a substantially symmetric structure about the center plane.

In FIG. 4 there is illustrated a further modified version of the embodiment shown in FIG. 1, which modified version results when the combination of the first end section 44 of the conduit and the elongated support 49 and the combination of the second end section 45 and the elongated support 50 included in the embodiment shown in FIG. 3 are bent towards one another to parallel positions tangential to the center section 49 of the looped midsection 50 of a loop angle approximately equal to 720 degrees and respectively extending therefrom in two opposite directions, wherein the common supporting structure 38 shown in FIG. 3 is now divided into two separate brackets 51 and 52. It should be noticed that the linear combination of the first end section 53 of the conduit and the elongated support 54 and the linear combination of the second end section 55 and the elongated support 56 respectively constitute the two parallel beams spanning the space between the two supporting brackets 51 and 52, which two parallel beams disposed on a common plane substantially tangential to the center section 49 of the looped midsection 50 of the conduit have the structural characteristics described in conjunction with FIG. 1, wherein the midsections of the two parallel beams may be mechanically tied to the center section 49 of the looped midsection 50 of the conduit.

Figure 5:
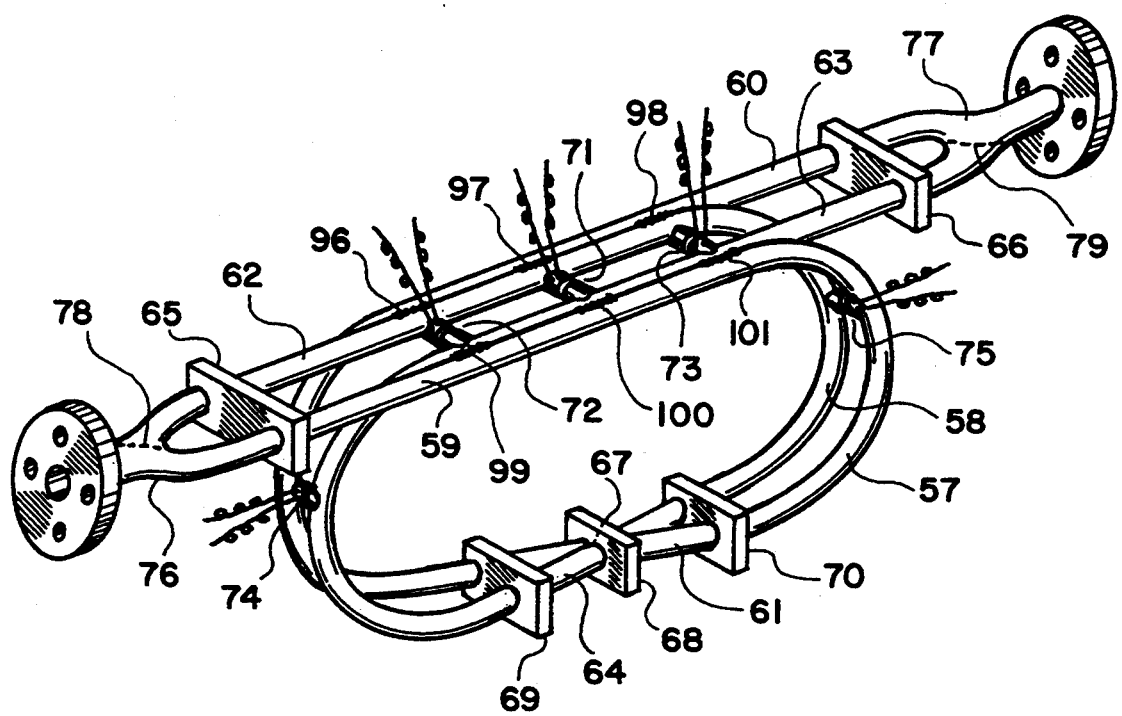
FIG. 5 illustrates an embodiment of the inertia force flowmeter comprising a pair of conduits, or a single flow passage conduit and a supporting conduit assembled into a structure substantially symmetric about a center plane perpendicularly intersecting with a midsection of the combined structure and dividing the combined structure into two opposite equal halves.

In FIG. 5 there is illustrated an embodiment of the inertia force flowmeter including a pair of conduits 57 and 58, each of which pair of conduits includes two end sections 59 and 60, and a looped midsection 61 of a loop angle approximately equal to 360 degrees, or two end sections 62 and 63, and a looped midsection 64 of a loop angle approximately equal to 360 degrees. The two opposite extremities of the combination of the pair of conduits 57 and 58 are restrained from experiencing lateral movements by two supporting brackets 65 and 66, respectively. The over-hanging extremities of the first end section 59 of the first conduit and the over-hanging extremity of the second end section 63 of the second conduit 58 are disposed in a side-by-side relationship and mechanically tied together at sections thereof adjacent to the respective looped midsections of the two conduits by weldings 99, 100 and 101, while the over-hanging extremities of the second end sections 60 of the first conduit 57 and the over-hanging extremities of the first end section 62 of the second conduit 58 are disposed in a side-by-side relationship, and mechanically tied to one another at sections thereof adjacent to the respective looped midsections of the two conduits by weldings 96, 97 and 98. It should be noticed that the two looped midsections 61 and 62 of the two conduits cross one another at the center sections 67 thereof in a physically crossing relationship as shown in the particular illustrated embodiment or in an over-lapping relationship in an alternative embodiment. The supporting bracket 68 and/or the supporting brackets 69 and 70 mechanically ties together middle portions of the looped midsections 61 and 64 of the two conduits 57 and 58. An electromagnetic vibrator 71 exerting a vibratory force on a line disposed on a center plane perpendicularly intersecting with the center sections 67 of the looped midsections 61 and 64 of the two conduits and dividing the combination of the two conduits into two opposite equal halves thereof generates a relative flexural vibration between the combination of a first half of the first conduit 57 and a second half of the second conduit 58, and the combination of a first half of the second conduit 58 and a second half of the first conduit 57 in an action-reaction relationship. A pair of relative motion or vibration sensors 72 and 73, or a pair of relative motion or vibration sensors 74 and 75 respectively disposed on two opposite sides of the center plane and respectively measuring relative flexural vibrations between the first halves of the two conduits and between the second halves of the two conduit 57 and 58 provide the two alternating electrical signals providing the electrical variable determining the mass flow rate of media moving through at least one of the two conduits 57 and 58. For an inertia force mass flowmeter measuring high flow rates of media, both of the two conduits 57 and 58 should respectively provide two parallel equal flow passages branching from one another at an inlet section 76 and merging with one another at an outlet section 77, wherein the center sections of two looped midsections 61 and 64 of the two conduits 57 and 58 must cross one another in an over-lapping relationship. In alternative design, the two flow passages respectively provided by the two conduits 57 and 58 may be connected in a series arrangement, wherein the inlet end section 62 of the second conduit 58 is connected to the outlet end section 60 of the first conduit 57 by a connecting conduit that is not shown in the particular illustrative embodiment. For an inertia force mass flowmeter measuring low flow rates of media, one of the two conduits 57 and 58 may include one or more blockages 78 and/or 79, whereby only the other of the two conduits 57 and 58 provides a single flow passage. The blockages 78 and/or 79 may be made of a valve that can be opened for measuring high flow rates of media and closed for measuring low flow rates of media, which valve providing the blockage can be used also for purging the media from the conduit with the blockage from time to time. It is generally preferred to employ the pair of relative motion or vibration sensors 74 and 75 in conjunction with the electromagnetic vibrator 71. It is readily recognized that an inertia force flowmeter shown in FIG. 5 can be modified to an embodiment employing the conduit configuration employed in the embodiment shown in FIG. 2. It should be understood that the embodiment shown in FIG. 5 is an elegant version of the embodiment shown in FIG. 1.

Figure 6:
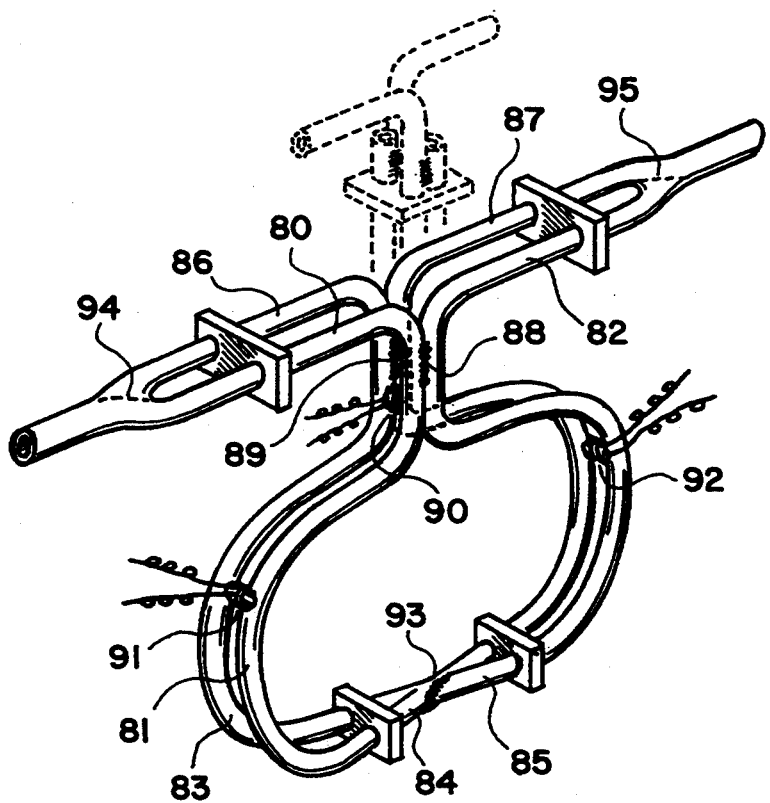
FIG. 6 illustrates a modified version of the embodiment shown in FIG. 5.

In FIG. 6 there is illustrated a modified version of the embodiment shown in FIG. 5, which modified version results, when the first end section 80 of the first conduit 81 and the second end section 82 of the second conduit 83 are disposed on a first plane approximately parallel to the looped midsections 84 and 85 of the two conduits and mechanically tied together at sections thereof adjacent to the respective looped midsections 84 and 85 of the two conduits, while the first end section 86 of the second conduit 83 and the second end section 87 of the first conduit 81 are disposed on a second plane parallel to and off-set from the plane including the end sections 80 and 82 of the two conduits 81 and 83, and mechanically tied together at sections thereof adjacent to the respective looped midsections 84 and 85 of the two conduits, which mechanical tyings are respectively provided by the weldings 88 and 89. The two end sections 80 and 82 of the two conduits tied together may be bent away from one another, and the two end sections 86 and 87 of the two conduits may also be bent away from one another as exemplified by an arrangement shown in solid lines, or those end sections may extend from a common supporting bracket in a generally common direction in straight configurations as exemplified by an arrangement shown in broken lines. An electromagnetic vibration 90 exerts a vibratory force on the tied together section of the combination of the end sections 80 and 82 of the two conduits and on the tied together section of the combination of the end sections 86 and 87 of the two conduits in an action-reaction relationship, and generates a relative flexural vibration between the combination of a first half of the first conduit 81 and a second half of the second conduit 83, and the combination of a first half of the second conduit 83 and a second half of the first conduit 81. A pair of relative motion or vibration sensors 91 and 92 measure the relative flexural vibration respectively at two locations located on two opposite sides of the center plane perpendicularly intersecting with the center sections 93 of the looped midsections 84 and 85 of the two conduits and dividing the combination of the two conduits 81 and 83 into two opposite equal halves, which two relative motion or vibration sensors respectively generates the two alternating electrical signals providing the electrical variable determining the mass flow rate of media moving through at least one of the two conduits 81 and 83. When one 83 of the two conduits 81 and 83 has a blockage 94 and/or 95, the midsection of the looped midsection 85 of the blocked conduit 83 may be cut off and welded to the center section of the looped midsection 84 of the conduit 81 that provides the single flow passage. In an alternative arrangements, the center sections of the continuous looped midsections 84 and 85 may cross one another in an over-lapping relationship or in a superimposing relationship.

While the principles of the present invention have now been made clear by the illustrated embodiments, there will be many modifications of the structures, arrangements, proportions, elements and materials, which are immediately obvious to those skilled in the art and particularly adapted to the specific working environments and operating conditions in the practice of the invention without departing from those principles. It is not desired to limit the invention to the particular illustrative embodiments shown and described and accordingly, all suitable modifications and equivalents may be regarded as falling within the scope of the invention as defined by the claims which follow.

The embodiments of the invention, in which an exclusive property or privilege is claimed, are defined as follows:

1. An apparatus for measuring mass flow rate of media comprising in combination:

a) a conduit with two opposite extremities restrained from experiencing lateral movements including a first end section extending from first of the two opposite restrained extremities of the conduit, a second end section extending from second of the two opposite restrained extremities of the conduit, and a looped midsection with a first half connected to the first and section of the conduit and a second half connected to the second end section of the conduit, said conduit having a configuration wherein at least a portion of a first half of the conduit and at least a portion of the second half of the conduit over-lap one another with a space therebetween; wherein the first half of the looped midsection of the conduit includes a first elongated supporting member extending from the first half of the looped midsection in a substantially parallel relationship to the second end section of the conduit and restrained from experiencing lateral movements at an extremity of the first elongated supporting member located next to the second restrained extremity of the conduit, and the second half of the looped midsection of the conduit includes a second elongated supporting member extending from the second half of the looped midsection in a substantially parallel relationship to the first end section of the conduit and restrained from experiencing lateral movements at an extremity of the second elongated supporting member located next to the first restrained extremity of the conduit;

b) means for exerting a vibratory force on the overlapping portions of the first and second halves of the conduit in an action-reaction relationship along a line disposed on a center plane substantially perpendicularly intersecting with a center section of the looped midsection of the conduit, wherein the vibratory force generates a relative flexural vibration between the combination of the first half of the conduit and the first elongated supporting member and the combination of the second half of the conduit and the second elongated supporting member; and c) means for detecting a difference between the flexural vibration experienced by the first half of the conduit and the flexural vibration experienced by the second half of the conduit as a measure of mass flow rate of media moving through the conduit.

2. An apparatus as defined in claim 1 wherein said combination includes means for determining mass flow rate of media moving through the conduit as a function of the difference in the flexural vibration between the first and second halves of the conduit.

3. An apparatus as defined in claim 1 wherein said means for detecting a difference in the flexural vibration comprises two motion sensors detecting the flexural vibration of the conduit respectively at two locations respectively located on two opposite sides of the center plane.

4. An apparatus as defined in claim 3 wherein said combination includes means for determining mass flow rate of media moving through the conduit as a function of an electrical variable related to a phase angle difference between two alternating electrical signals respectively generated by the two motion sensors.

5. An apparatus as defined in claim 1 wherein said means for detecting a difference in the flexural vibration comprises two relative motion sensors detecting the relative flexural vibration between the combination of the first half of the conduit and the first elongated supporting member and the combination of the second half of the conduit and the second elongated supporting member respectively at two locations respectively located on two opposite sides of the center plane.

6. An apparatus as defined in claim 5 wherein said combination includes means for determining mass flow rate of media moving through the conduit as a function of an electrical variable related to a phase angle difference between two alternating electrical signals respectively generated by the two relative motion sensors;

7. An apparatus as defined in claim 1 wherein said combination includes means for restraining a middle portion of the looped midsection of the conduit from experiencing lateral movements.

8. An apparatus as defined in claim 7 wherein said means for detecting a difference in the flexural vibration comprises two relative motion sensors detecting the relative flexural vibration between the combination of the first half of the conduit and the first elongated supporting member and the combination of the second half of the conduit and the second elongated supporting member respectively at two locations respectively located on two opposite sides of the center plane, and said combination includes means for determining mass flow rate of media moving through the conduit as a function of an electrical variable related to a phase angle difference between two alternating electrical signals respectively generated by the two relative motion sensors.

9. An apparatus as defined in claim 1 wherein the first elongated supporting member comprises a first auxiliary flow passage branching from the first half of the looped midsection of the conduit and merging with the second end section of the conduit, and the second elongated supporting member comprises a second auxiliary flow passage branching from the first end section of the conduit and merging with the second half of the looped midsection of the conduit.

10. An apparatus as defined in claim 9 wherein said means for detecting a difference in the flexural vibration comprises two motion sensors detecting the flexural vibration of the conduit respectively at two locations respectively located on two opposite sides of the center plane.

11. An apparatus as defined in claim 10 wherein said combination includes means for determining mass flow rate of media moving through the conduit as a function of an electrical variable related to a phase angle difference between two alternating electrical signals respectively generated by the two motion sensors.

12. An apparatus as defined in claim 9 wherein said means for detecting a difference in the flexural vibration comprises two relative motion sensors detecting the relative flexural vibration between the combination of the first half of the conduit and the first elongated supporting member and the combination of the second half of the conduit and the second elongated supporting member respectively at two locations respectively located on two opposite sides of the center plane.

13. An apparatus as defined in claim 12 wherein said combination includes means for determining mass flow rate of media moving through the conduit as a function of an electrical variable related to a phase angle difference between two alternating electrical signals respectively generated by the two relative motion sensors.

14. An apparatus as defined in claim 1 wherein the second elongated supporting member comprises a first end section of another conduit with two opposite extremities restrained from experiencing lateral movements and having a looped midsection, and the first elongated supporting member comprises a second end section of said another conduit; wherein the looped midsections of said a and another conduit cross one another at respective center sections of the looped midsections of said a and another conduit, and said means for exerting a vibratory force generates a relative flexural vibration between a combination of the first half of said a conduit and a second half of said another conduit and a combination of the second half of said a conduit and a first half of said another conduit.

15. An apparatus as defined in claim 14 wherein said another conduit has means preventing media from flowing through said another conduit.

16. An apparatus as defined in claim 15 wherein said means for detecting a difference in the flexural vibration comprises two relative motion sensors detecting the relative flexural vibration between the combination of the first half of said a conduit and the second half of said another conduit and the combination of the second half of said a conduit and the first half of said another conduit respectively at two locations respectively located on two opposite sides of the center plane.

17. An apparatus as defined in claim 14 wherein said combination includes means for determining mass flow rate of media moving through said a conduit as a function of an electrical variable related to a phase angle difference between two alternating electrical signals respectively generated by the two relative motion sensors.

18. An apparatus as defined in claim 18 wherein said a and another conduit provides two flow passages disposed in one of the parallel and series relationships therebetween.

19. An apparatus as defined in claim 18 wherein said means for detecting a difference in the flexural vibration comprises two relative motion sensors detecting the relative flexural vibration between the combination of the first half of said a conduit and the second half of said another conduit and the combination of the second half of said a conduit and the first half of said another conduit respectively at two locations respectively located on two opposite sides of the center plane.

20. An apparatus as defined in claim 19 wherein said combination includes means for determining mass flow rate of media moving through at least one of said a and another conduit as a function of an electrical variable related to a phase angle difference between two alternating electrical signals respectively generated by the two relative motion sensors.

* * * * *